(No Model.)
J. A. KURTZ.
BAND FOR PROTECTING SCREW THREADS OF PIPES.
No. 440,168. Patented Nov. 11, 1890.
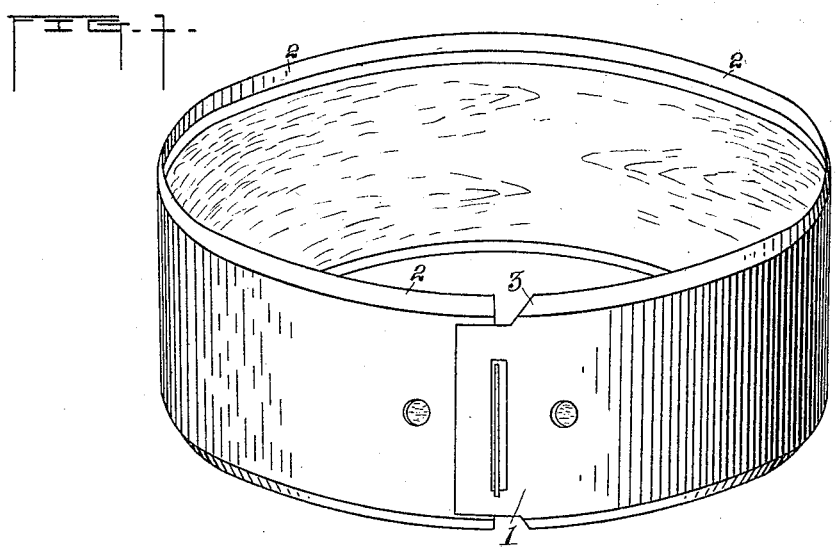
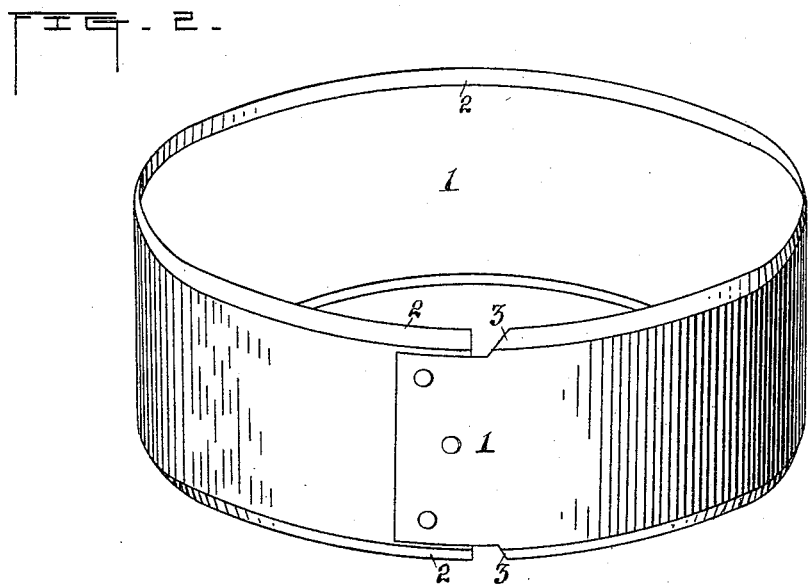
Witnesses
Arch M. Catlin
George Davis
Inventor
John A. Kurtz
by
Benj. R. Catlin Attorney

UNITED STATES PATENT OFFICE.

JOHN A. KURTZ, OF ALLEGHENY, PENNSYLVANIA, ASSIGNOR TO E. T. COOPER AND WILLIAM TRAUT, BOTH OF SAME PLACE.

BAND FOR PROTECTING SCREW-THREADS OF PIPES.

SPECIFICATION forming part of Letters Patent No. 440,168, dated November 11, 1890.

Application filed July 18, 1890. Serial No. 359,138. (No model.)

*To all whom it may concern:*

Be it known that I, JOHN A. KURTZ, a resident of Allegheny, in the county of Allegheny and State of Pennsylvania, have invented certain new and useful Improvements in Pipe-Thread Protectors; and I do hereby declare the following to be a full, clear, and exact description of the invention, such as will enable others skilled in the art to which it pertains to make and use the same.

The object of the invention is to provide a cheap and efficient band or ring for the protection of the screw-threads of pipes or bolts, and one that shall be adapted for use with various cheap linings—such as wood, asphaltum, oakum, and other matters—particularly such as are not sufficiently firm or tough for use without a protecting-band; and it consists in the matters hereinafter described and pointed out.

In the drawings, Figure 1 is a perspective. Fig. 2 is a section on line $x\,x$ of Fig. 1. Fig. 3 is a similar section of a modification showing the device applied to a pipe.

Numeral 1 denotes a metallic band or ring having on each edge a flange 2. Said flanges are made about as wide as the usual depth of the thread on pipes having such diameter as to fill the band, and they are preferably made spiral, or so that they will run between the threads on the pipe to which they are applied. The lateral distance between the ends of each flange where they would overlap each other if sufficiently prolonged will therefore equal the width of the thread. For convenience, however, in entering the flange into the thread at the end of a pipe or bolt, the flanges are made a little shorter than the circumference of the ring, as shown at 3. Either end of a band thus formed can be made to engage the screw-threaded end of a pipe, and the band can then be screwed thereon, though the band would be operative if only one of its flanges were adapted to be screwed upon the pipe. In practice, it is screwed on until the outer flange is brought close to the end of the pipe, so as to cover or overhang its outer edge, and thereby afford protection to its screw-thread at that point. These flanges also serve to stiffen the band and thus render more thorough the protection afforded by them to the said threads.

They can also be used as a means of retaining a lining made of wood, asphaltum, oakum, or other frangible or weak materials. Protectors made of wood have been found unsuitable because of their tendency to split when screwed upon the pipe. The screw-threads of the pipe will split such bands, and the evil is aggravated by the rough usage to which they are exposed in handling and transportation; but I have found that wood and other like materials can be used for lining metal bands by providing each edge thereof with a retaining-flange, such as herein specified. In case the improved metal bands are used the splitting or breaking of the wood or other lining material is not a serious difficulty, as it is retained in position on the screw-threaded portion of the pipe by the flanges above described, even though it is fractured or split. When such a lining is used with the improved band having the two retaining-flanges, the lining may be made to engage the threads of the pipe and screwed thereupon, and in such case it is not essential that the flanges engage the threads. If desired, however, both the flanges and the lining can have such engagement and be screwed onto the pipe.

I am aware that a tough lining of paper and the like have been used with a metal band, and such device is not of my invention, it being characteristic of this improvement that a band is employed with a flange at each end, whereby the band is stiffened and the lining of wood or like material can be employed, and whereby a flanged end of the ring or band can be screwed upon a pipe.

The bands above described may be closed by rivets, or by any suitable means, or the ends of the blank from which they are made can be left unjoined. For pipes of small size it is unnecessary to provide closed bands. In some cases the ends of the metal forming the bands may be left unjoined until they have been placed around the pipe, and can then be fastened together by locking devices of any suitable character. A pipe could be partially entered in such an open band and the ends of the band metal be then riveted or locked together and the band screwed upon the pipe. In case the lining is relied upon to hold the band upon the pipe, both flanges can be in a right plane and need not engage the pipe-threads, and they will nevertheless serve to retain the lining and stiffen the band.

It is proposed in some cases to use wood veneers cut crosswise the grain of the wood for lining, and also other such frangible and cheap linings as may be found convenient. These will be securely held in place by the flanges, even though such linings become broken. Bands provided with such linings may be dipped in a cheap paint or in asphalt or other adhesive substance to aid in retaining the linings, though this is not essential, it being chiefly important to provide flanges on each end of the ring or bands to insure protection of the threads, and, preferably, at least one of said flanges is made spiral to follow the screw-threads of the pipe and the engagement of the band at both ends of the screw-threaded portion of the pipe, such engagement being either of the flanges or of the frangible lining held in place thereby, is according to the purpose of the improvement. I am thus enabled either to dispense with linings entirely or to use those of a cheaper quality than heretofore used, and yet obtain equally good results—as with the more expensive linings—a saving quite desirable in an article which is conveniently made so cheap as to be economically thrown away after use.

Having thus described my invention, what I desire to secure by Letters Patent is—

1. The device for protecting the screw-threaded ends of pipes, consisting of a band provided with flanges on each end of the band and adapted to engage the screw-threads of the pipe, substantially as set forth.

2. The device for protecting the screw-threaded ends of pipes, consisting of a band provided with flanges on each end and a lining held in place at each of its edges by said flanges, substantially as set forth.

3. The device for protecting the screw-threaded ends of pipes, consisting in the bands having flanges at each end, and a lining of wood or like material, one of said flanges being adapted to surround the pipe at the inner end of the screw-thread and the other to protect the outer end, substantially as set forth.

In testimony whereof I have signed this specification in the presence of two subscribing witnesses.

JOHN A. KURTZ.

Witnesses:
FRANK C. KENNEDY,
J. K. EWING.